3,058,991
PROCESS FOR THE MANUFACTURE OF DYESTUFFS

Walther Wolf, Georg Rösch, and Eberhard Degener, Leverkusen, Helmut Klappert, Köln-Stammheim, and Siegfried Petersen, Leverkusen, Germany, assignors to Farbenfabriken Bayer Aktiengesellschaft, Leverkusen, Germany, a corporation of Germany
No Drawing. Filed Oct. 4, 1960, Ser. No. 60,298
Claims priority, application Germany Mar. 18, 1957
5 Claims. (Cl. 260—313)

This invention relates to novel dyestuffs and more particularly to macrocyclic phthalocyanine-like dyestuffs and to a process for their production and to intermediates for such dyestuffs and to methods for their production.

It is an object of the present invention to provide novel dyestuffs. Another object is to provide phthalocyanine-like dyestuffs in new shades. A further object is to provide dyestuffs which have excellent fastness properties. Other objects are to provide novel compounds which can be used for the production of said dyestuffs. Still another object is to provide simple processes for the production of these compounds. More objects will appear hereinafter.

These objects are obtained according to the present invention by subjecting compounds which may be designated in one of their tautomeric forms as optionally substituted 1 - amino - 3 - imino-4,7-dithia-4,5,6,7-tetrahydro-isoindolenines, if desired, in mixture with other 3,4-di-substituted 2 - amino - 5 - imino-pyrrolenines and/or 1-phenyl-3,5-diamino-triazol-(1,2,4), to a heat treatment in substance or on a substrate preferably in the presence of heavy metals or heavy metal compounds and preferably in the presence of reducing agents and in the presence of solvents, which can have reducing properties. The 1-amino - 3 - imino-4,7-dithia-4,5,6,7-tetrahydro-isoindolenines may be further substituted in the 5- and 6-position for example by alkyl radicals preferably lower alkyl radicals containing up to 4 carbon atoms or aryl preferably phenyl radicals.

These compounds can be designated in one of their theoretically possibly tautomeric forms by the following formula

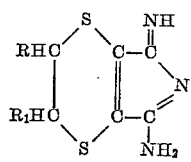

wherein R and $R_1$ stand for hydrogen, lower alkyl or aryl radicals. In another tautomeric formula these compounds can be described as 1,3-diimino-4,7-dithia-4,5,6,7-tetrahydro-isoindolines.

These compounds can be obtained by reacting the salts of 1,2-dimercapto-1,2-dicyanoethylene with organic compounds containing an exchangeable group on each of two carbon atoms which are in α-position in said organic compounds producing the 1,2-dicyano-3,6-dithia-cyclo-hexenes-(1) which can be reacted with ammonia to the 1 - amino - 3-imino-4,7-dithia-4,5,6,7-tetrahydro-isoindolenines.

The production of the 1,2 - dicyano-3,6-dithia-cyclo-hexenes-(1) can be carried out in the presence of inert solvents such as ethanol, acetone, dimethyl formamide, water, methyl glycol acetate, dioxan, pyridine or xylene. It is advantageous to operate in a dilute solution. The reaction is, moreover, preferably carried out at the lowest possible temperatures. The optimum temperature range depends in each case on the reactivity of the exchangeable groups. In general, satisfactory results are attained by operating at temperatures within the range of between 0 and 160° C., preferably 20–80° C., but other temperatures may also be chosen.

Salts of the 1,2-dicyano-1,2-dimercapto ethylene are for example the alkali metal salts, the alkaline earth metal salts or the zinc or lead salts.

Compounds having an exchangeable group on two carbon atoms which are in α-position are, for example, 1,2-dichloroethane, 1,2-dibromethane, 1,2-dibromo-1-phenyl-ethane, ethane-1,2-dimethane-sulfonate, propane-1,2-di-p-toluene-sulfonate or 1,2-dibromo-cyclohexane.

The cyclohexenes obtained can be substituted in the 4- and/or 5-position for example by cyano- or aryl groups or by alkyl groups which can contain hetero atoms such as O. Furthermore these cyclohexenes can contain a second double bond between the C-atoms in 4- and 5-position.

The reaction of the 1,2-dicyano-3,6-dithiacyclohexenes-(1) with ammonia is advantageously carried out in a solvent such as a low molecular weight alcohol, e.g. methanol or ethanol; or ethylene glycol or its monomethyl or ethyl ether, or formamide, preferably at a moderate temperature. In general, temperatures within the range of 0–50° C., preferably 15–30° C., are suitable. The reaction can generally be accelerated at a somewhat elevated temperature and in the presence of catalysts. Suitable catalysts are, for example, metal hydroxides, metal amides and metal alcoholates, especially those of the alkali metals and heavy metals having the tendency to form complexes or the salts thereof such as Raney nickel, copper acetate or cobalt chloride. The reaction may also be carried out in two steps by first reacting the 1,2-dicyano-3,6-dithia-cyclohexene-(1) with alcohols such as methanol, ethanol or ethylene glycol, to form the corresponding isoindolenines substituted in the 3-position by two alkoxy groups. For this purpose it is advantageous to use an excess of alcohol and to operate at low temperatures, for example at 10–50° C., preferably at 15–30° C. The resultant reaction products generally crystallise out. The reaction products thus obtained may be reacted with ammonia in a solvent, if desired.

An alternative of the process for the production of the 1 - amino - 3 - imino-4,7-dithia-4,5,6,7-tetrahydro-isoindolenines from the cyclohexenes consists in first preparing from the 1,2-dicyano-3,6-dithia-cyclohexenes-(1) the hydrogen halide addition compounds by reacting the dinitriles with hydrogen halide e.g. hydrogen chloride or bromide and an alcohol in an inert solvent, or by the addition of hydrogen halides in glacial acetic acid and subsequently reacting the halides thus obtained with ammonia.

The reaction of the cyclohexenes with the ammonia may be carried out, for example, by treating the 1,2-di-cyano-3,6-dithia-cyclohexenes directly with liquid ammonia, if desired in the presence of the above mentioned catalysts. It is, however, also possible to react the dinitriles in such a manner that the dinitriles are first dissolved respectively dispersed in a solvent to which a catalyst may be added, and by then introducing gaseous ammonia. The reaction products may be worked up according to conventional processes.

The 4,7-dithia-4,5,6,7-tetrahydro-insoindolenines can, moreover, also be obtained in a similar manner to the Pinner imino ether synthesis by conversion of the corresponding dinitriles with hydrogen halide such as hydrogen chloride or hydrogen bromide and an alcohol in inert solvents, or in accordance with the process of French patent specification No. 1,070,912 by conversion of dinitriles with hydrogen halide in glacial acetic acid and subsequent conversion of the reaction products thus obtained with ammonia.

For the production of the new dyestuffs the 1-amino-3-imino-4,7-dithia-4,5,6,7-tetrahydro-isoindolenines to be employed in accordance with the invention can also be reacted under the same reaction conditions in mixture with other 3,4-disubstituted 2-amino-5-imino-pyrrolenines, such as 3,4-dialkylsubstituted 2-amino-5-imino-pyrrolenines such as 3,4-dimethyl-2-amino-5-imino-pyrrolenine or optionally substituted 1-amino-3-imino-isoindolenines such as the 1-amino-3-imino-isoindolenine or/and 1-phenyl-3,5-diaminotriazol-(1,2,4). In this event there are formed dyestuffs having fastness properties similar to those produced by the sole application of 1-amino-3-imino-4,7-dithia-4,5,6,7-tetrahydro-isoindolenines.

These dyestuffs can be designated in one of their tautomeric forms by the following formula:

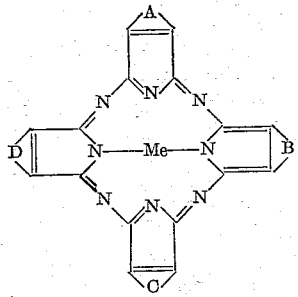

wherein A, B and C are radicals selected from the group consisting of lower alkyl,

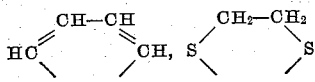

lower alkyl-substituted

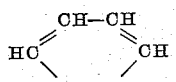

phenyl-substituted

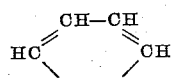

lower alkyl-substituted

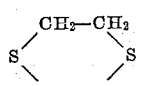

and phenyl-substituted

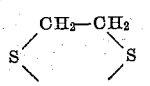

and wherein D stands for a radical selected from the group consisting of

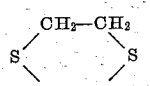

lower alkyl-substituted

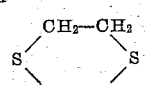

and phenyl-substituted

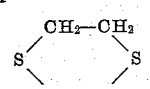

and wherein Me is a heavy metal atom selected from the group consisting of nickel, cobalt and copper.

The dyestuffs can be produced in substance or on a substrate. The production of the dyestuffs in substance can be carried out by simple heating to elevated temperatures, for example, 100–200° C. in the presence of a heavy metal compound and preferably in the presence of a weakly reducing organic solvent. The formation of the dyestuffs on fibres or textile materials can be effected for example, by neutral or acid steaming of the 1-amino-3-imino-4,7-dithia-4,5,6,7-tetrahydroisoindolenines, which are—if desired, in admixture with the aforesaid compounds—brought on the materials to be decorated in the presence of heavy metal compounds and in the presence of solvents which have preferably reducing properties at temperatures of about 100° C. or above 100° C.

Suitable heavy metal compounds are, for example, nickel acetate, nickel propionate, nickel formiate, cobalt chloride, copper sulfate, copper phenylacetate and the copper complex compound of sarcosine or ethylene diamine tetraacetic acid or other salts of the heavy metals.

As solvent there may be used for example alone or in mixture ethylene glycol, propylene glycol, thiodiglycol, triisopropanolamine or poly-glycols, and also acid amides, such as formamide or form-methylaniline. The production of the dyestuffs in substance is generally effected in closed vessels in order to enable the employment of readily volatile solvents such as methanol or pyridine.

For the process according to the invention it is not necessary to use the 1-amino-3-imino-4,7-dithia-4,5,6,7-tetrahydroisoindolenines in an isolated form; it is, in general, sufficient to work under conditions in which these compounds are intermediately formed. It is possible, for example, to heat to elevated temperatures possibly substituted 1,2-dicyano-3,6-dithiacyclohexene-(1) in a solvent in the presence of heavy metal salts, and in the presence of small quantities of ammonia. There is intermediately formed 1-amino-3-imino - 4,7 - dithia - 4,5,6,7-tetrahydroisoindolenine. Since a number of these molecules condense to give the phthalocyanine like dyestuff molecule, amomnia is freed in this condensation for a further reaction of the starting material. The reaction can be carried out as well in the presence of the aforementioned pyrrolenines or cyclic bis-amidines, in this case also eventually in the absence of additional ammonia since in the reaction ammonia is formed.

Instead of 1,2-dicyano-3,6-dithiacyclohexenes there can also be used the alcohol adducts easily obtainable therefrom, for example, $C_8H_{12}N_2O_2S_2$ which may be produced from 1,2-dicyano-3,6-dithiacyclohexene ($C_6H_4N_2S_2$) by conversion with methanol in the presence of a little NaOCH$_3$ at 20–25° C. The adduct is colourless, crystallises in prisms and decomposes at 137° C.

The formation of the final dyestuffs proceeds via intermediate products which themselves have not yet dyestuff character but already contain the metal in complex combination. The synthesis of the dyestuffs may be interrupted at any stage by first condensing in vitro 1-amino-3-imino-4,7-dithia-4,5,6,7-tetrahydroisoindolenine, formed in an isolated or intermediate form, with itself alone or with the aforesaid mixed components, in the presence of a heavy metal compound, preferably under mild conditions e.g. temperatures up to about 90° C. and then completing the dyestuff synthesis with the intermediate compounds formed in the presence of an agent having reducing properties and in a solvent preferably at elevated temperature. The condensed dyestuff intermediate products can be isolated since they are soluble in water and methanol with greater difficulty than the amino-imino-dithia-tetrahydroisoindolenines.

The following examples are given for the purpose of illustrating the invention, the parts by weight and the parts by volume being in the ratio of grams to millilitres.

This application is a continuation-in-part application of our copending applications Serial Nos. 722,135, 722,153, both now abandoned, and 722,160, now U.S. Patent 2,941,292, filed March 18, 1958.

Example 1

95 grams of the disodium salt of 1,2-dicyano-1,2-dimercaptoethylene and 5 grams of the sodium salt of di-n-butylnaphthalene-sulphonic acid are dissolved in 500 millilitres of water. 40 millilitres of ethylene chloride are then added dropwise at 50–60° C. and the mixture is vigorously stirred at this temperature for two hours.

Upon cooling to 20° C. suction-filtration of the solid portions, washing with water and drying, the resultant 1,2-dicyano-3,6-dithiacyclohexene-(1) is isolated. Yield: 22 grams (M.P. 132–133° C.).

10 parts by weight of 1,2-dicyano-3,6-dithiacyclohexene-(1) are stirred in 50 parts by weight of ethylene glycol at 70° C. for one hour while passing over $NH_3$, the temperature is then slowly decreased to 20° C. and the resultant brownish yellow solution is further saturated with ammonia. The temperature is finally reduced to 0° C. to complete the crystallisation of the formed base. By suction-filtration and washing with acetone, 6.5 parts by weight of 1-amino-3-imino-4,7-dithia-4,5,6,7-tetrahydro-isoindolenine are obtained.

4 parts by weight of 1-amino-3-imino-4,7-dithia-4,5,6,7-tetrahydroisoindolenine or the tautomeric 1,3-diimino-4,7-dithia-4,5,6,7-tetrahydroisoindoline and 1 part by weight of copper acetate are dissolved in 100 parts by weight of ethylene glycol. A cotton fabric is impregnated with this solution, the excess solution removed by squeezing and the fabric heated in a drying oven to 120–140° C. for 10 minutes. After boiling out with soap solution, there remains on the cotton a strong, dull violet dyeing fast to light. The dyestuff obtained corresponds to the following formula:

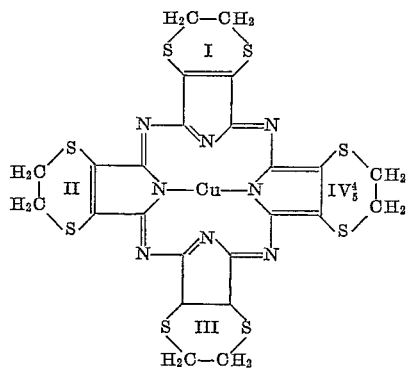

Example 2

200 grams of the disodium salt of 1,2-dicyano-1,2-dimercaptoethylene are dissolved in 800 millilitres of methanol and nitrogen is passed over. 200 grams of 1,2-dibromethane in 100 millilitres of methanol are added dropwise with stirring and the temperature is kept at 20–25° C. by external cooling with water. Stirring is continued at 25° C. for half hour, the temperature is then slowly raised and the reaction finally completed by boiling under reflux for one hour. Upon cooling with ice, a mixture of sodium bromide and 1,2-dicyano-3,6-dithiacyclohexene-(1) is filtered off by suction which is freed from sodium bromide by washing with water. By concentration of the alcoholic reaction solution, further quantities of dinitrile may be precipitated. A total of about 160 grams of the dicyano-dithia-cyclohexene are thus obtained. The crude product is purified by recrystallisation from 70 percent alcohol, 50 percent acetone or acetic acid using charcoal.

4 parts by weight of 1,2-dicyano-3,6-dithia-cyclohexene-(1) are stirred with 20 parts by weight of 3,3-n-methanolic ammonia at room temperature for one week or allowed to stand. During this period the colourless crystals of the starting material disappear. At the same time, the 1,3-diimino - 4,7 - dithia-4,5,6,7 - tetrahydro-isoindoline (or 1-amino-3-imino-4,7-dithia-4,5,6,7-tetrahydro-isoindolenine) crystallises out in deep yellow crystals.

The reaction product is filtered off by suction. The residue remaining in the solution may be isolated by evaporation of the solvent or it may be precipitated as a red nitrate by stirring the filtrate in an aqueous ammonium nitrate solution in acetic acid. The total yield is quantitative.

4 parts by weight of 1-amino-3-imino-4,7-dithia-4,5,6,7-tetrahydro-isoindolenine and 1 part by weight of copper acetate are dissolved in 100 parts by weight of ethylene glycol. The solution is then heated to 140° C. for a brief period, the temperature being kept above 120° C. for about 10 minutes. The same octathiahexadecahydro copper phthalocyanine is thus substantially formed as that obtained on the fibre according to the process given in Example 1. By dilution of the cooled reaction mixture with methanol, suction-filtration of the precipitate, washing with methanol and drying there are obtained 3,4 parts by weight of the dyestuff pigment having a purity of approximately 95 percent.

*Analysis.*—Cu, 8.3%; S, 33.5%; N, 15.55%.

The dyestuff may further be purified by redissolving from concentrated sulphuric acid. The colour of the solution in sulphuric acid is green.

Example 3

3 parts by weight of nickel acetate corresponding to $(CH_3COO)_2Ni(H_2O)_4$, 8 parts by weight of 1,2-dicyano-3,6-dithia-cyclohexene-(1), 1 part by weight of 7-n methanolic ammonia and 100 parts by weight of thiodiglycol are heated with stirring to 140–150° C. and this temperature is maintained for 15 minutes. 1-amino-3-imino-4,7-dithia-4,5,6,7-tetrahydro-isoindolenine is obtained as an intermediate which is converted into the octathiahexadecahydro-nickel phthalocyanine at about 100–150° C. Working up is carried out as described in Example 2. 8 grams of a black pigment dyestuff are thus obtained, the formula of which corresponds to the formula indicated in Example 1 wherein the copper is substituted by nickel.

*Analysis.*—S, 31.4%; N, 15.19%; Ni, 7.3%.

The dyestuff can further be purified by redissolving from sulphuric acid and at the same time brought into a form suitable for pigment printing. The colour of the solution in concentrated sulphuric acid is green.

Example 4

3 parts by weight of nickel acetate, 8 parts by weight of 1,2-dicyano-3,6-dithia-cyclohexene-(1) and 2 parts by weight of 1-amino-3-imino-isoindolenine are heated in 100 parts by weight of ethyleneglycol and kept at 140–150° C. for 15 minutes. Working up is carried out as described in Example 2. 7 grams of a violet-black mixed dyestuff are obtained. This mixture contains the following dyestuffs:

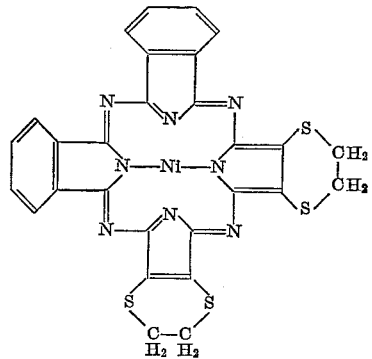

resp.

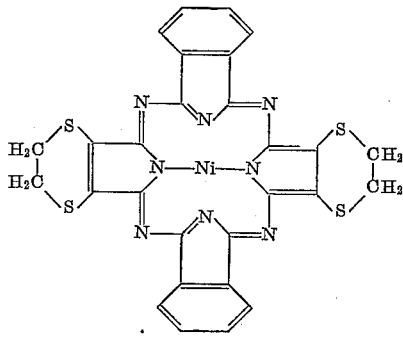

and

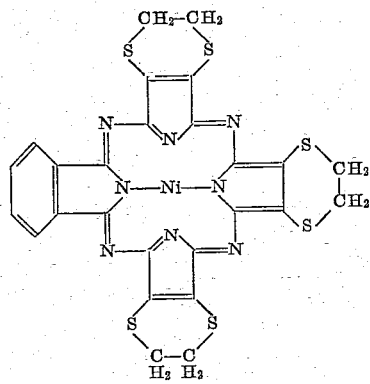

*Analysis.*—Ni, 8.6%; S, 24.0%; N, 17.10%.

The atomic ratio Ni:S:N is therefore approximately 1:5:8. By redissolution from concentrated sulphuric acid, the composition of the dyestuff is not changed.

*Example 5*

10 parts by weight of 1-amino-3-imino-4,7-dithia-4,5,6,7-tetrahydro-isoindolenine and 2 parts by weight of copper acetate are heated to 65° C. for 40 minutes in 90 parts by weight of methanol. 10 parts by weight of a brown dyestuff intermediate product are thus obtained which may readily be isolated by suction-filtration at room temperature. It contains 7% Cu, 29.4% S and 16.23% N. The compound can be represented by the following formula:

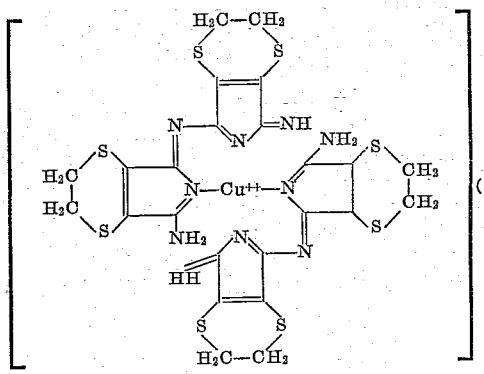

11–12 percent of the starting material may be precipitated from the filtrate as a red nitrate.

The dyestuff intermediate product is soluble in thiodiglycol, diglycol monomethyl ether and similar solvents and can be converted into the octathia-hexadecahydro copper phthalocyanine by heating to temperatures of above 100° C. For this purpose there are dissolved, for example, 4 parts by weight of the dyestuff intermediate product in 30 parts by weight of thiodiglycol and 5 parts by weight of diglycol monomethyl ether, the solution is mixed with 50 parts by weight of tragacanth thickening (65:1000) and 11 parts by volume of water. The dyestuff paste is printed on cotton, pre-dried and the dyestuff is developed by heating to 140° C. for 10 minutes. The conventional after-treatment follows and a deep violet-blue print is obtained with very good fastness properties.

*Example 6*

A printing paste of 3 parts by weight of 1-amino-1-imino-4,7-dithia-4,5,6,7-tetra hydroisoindolenine,
3 parts by weight of formamide,
3 parts by weight of dimethyl formamide,
3 parts by weight of thiodiglycol,
3 parts by weight of diglycol monomethyl ether,
3 parts by weight of triethanolamine,
35 parts by weight of tragacanth thickening (65:1000)

3 parts by weight of a 16.5 percent nickel chloride solution and
44 parts by volume of water is printed on a cotton fabric which is steamed at 100–105° C. for 10 minutes after the usual pre-dying and soaped with boiling. A deep violet print is obtained which is extremely fast to light.

*Example 7*

2 parts by weight of 1-amino-3-imino-4,7-dithia-4,5,6,7-tetrahydroisoindolenine and 6 parts by weight of a technical 80 percent 1-amino-3-imino-isoindolenine are stirred in 15 parts by weight of a solvent mixture consisting of equal parts of formamide, dimethyl formamide, thiodiglycol, diglycol monomethyl ether and triethanolamine, 10 parts by weight of a 11.9 percent copper chloride solution, 40 parts by weight of tragacanth thickening (65:1000) and 27 parts by volume of water to give a printing paste. Fabric of cotton or artificial silk are printed with this printing paste and the dyestuff is developed on the fibre, after usual pre-drying, by neutral steaming at 100–105° C. for 10 minutes. By after-treatment in conventional manner the print is completed. A clear navy blue is obtained having very good fastness properties.

*Example 8*

6 parts by weight of 1-amino-3-imino-4,7-dithia-4,5,6,7-tetrahydroisoindolenine and 2 parts by weight of a technical 80 percent 1-amino-3-imino-isoindolenine are stirred with 15 parts by weight of the solvent mixture indicated in Example 7, 11 parts by weight of a 16.5 percent nickel chloride solution, 40 parts by weight of tragacanth thickening (65:1000) and 26 parts by volume of water to form a printing paste. Cotton and rayon fabrics are printed with this printing paste, pre-dried and the dyestuff is developed on the fibre by neutral steaming at 100–105° C. for 10 minutes.

The material is after-treated in conventional manner. A neutral black print is obtained of very good fastness properties.

*Example 9*

10 parts by weight of 1-amino-3-imino-4,7-dithia-4,5,6,7-tetrahydro-isoindolenine and 35 parts by weight of 1-amino-3-imino-isoindolenine are stirred with 10 parts by weight of copper acetate in 200 parts by volume of thiodiglycol for 2 hours at a temperature of 65–70° C. in the dark. The brown-yellow solution obtained contains small amounts of dyestuff which is filtered off. A metal-containing dyestuff intermediate is obtained from the filtrate by introducing the filtrate into water, and filtering off the precipitate. There are obtained 27 parts by weight of a light brown powder which contains 6.9% copper, 10.7% S and 18.35% N.

From this dyestuff intermediate there can be obtained a navy-blue dyestuff in substance or on fibers by treating this dyestuff intermediate in neutral or acid medium at higher temperatures with a mild reducing agent or at lower temperatures with a stronger reducing agent. If the dyestuff intermediate is dissolved in methanol and a small amount of glacial acetic acid and then introduced into a cold aqueous dithionite solution the blue dyestuff is obtained immediately. If the dyestuff intermediate is dissolved in a solvent containing hydroxy ethyl groups and is printed in the presence of a tragacanth thickener on a cotton material, the blue dyestuff is obtained on this cotton material after pre-drying the printed material by a neutral or acid steaming period of 10 minutes at a temperature of 100–105° C.

*Example 10*

To a solution of 14 parts by weight of 1-amino-3-imino-4,7-dithia-4,5,6,7-tetrahydro-isoindolenine and 20 parts by weight of 1-phenyl-3,5-diamino-triazol-(1,2,4) in 200 parts by volume of ethylene glycol is added dropwise a solution of 5 parts by weight of iron chloride in 100 parts by volume of dimethyl formamide at 110° C. The mixture is then stirred for 8 hours at 100–110° C. and then diluted with 200 parts by volume of methanol. The precipitate is filtered off, washed with methanol and water and dried. There are obtained 15.5 parts by weight of a brown dyestuff containing 7.3% iron and 20.2% sulfur. 10 parts by weight of this dyestuff are dissolved in 200 parts by volume of pyridine, filtered and the filtrate is introduced into water of 70° C. Thus, 7 parts by weight of a pure hemiporphyrazine are obtained containing 7.8% iron and 19.2% sulfur. The dyestuff corresponds to the following formula:

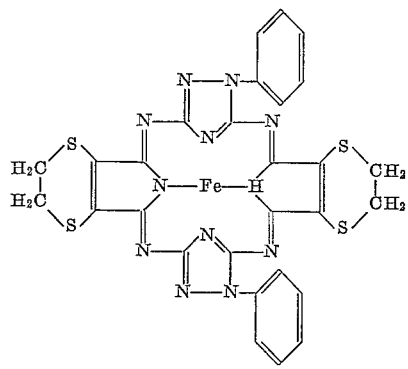

Similar dyestuffs are obtained if instead of the iron salt equivalent amounts of a copper or nickel salt are used.

*Example 11*

A mixture consisting of 20 parts by weight of 2-amino-5-imino-3,4-dimethyl-pyrrolenine nitrate, 20 parts by weight of 1-amino-3-imino-4,7-dithia-4,5,6,7-tetrahydro-isoindolenine and 10 parts by weight of copper acetate are dissolved in 200 parts by volume of ethylene glycol and stirred for 1 hour at 110–120° C. Thereafter the solution is diluted with water, the precipitate filtered off and boiled with diluted hydrochloric acid and diluted aqueous sodium hydroxide solution and washed neutral. There are obtained 24 parts by weight of a violet dyestuff. The color of the dyestuff in concentrated sulfuric acid is blue-green. The dyestuffs can be obtained unchanged from the concentrated sulfuric acid. The dyestuff mixture contains the following dyestuffs:

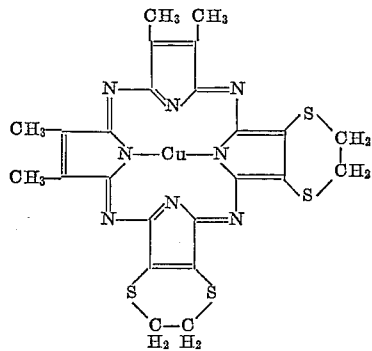

resp.

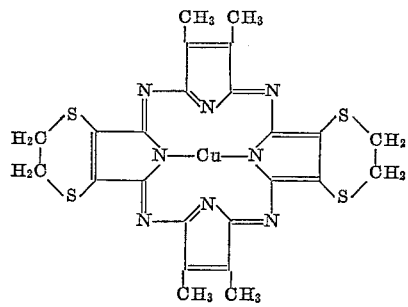

and

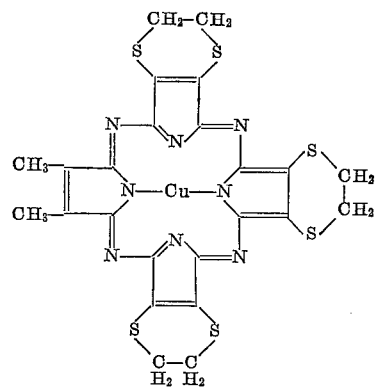

Corresponding nickel-containing dyestuffs are obtained if instead of the copper acetate a corresponding amount of nickel acetate is used.

*Example 12*

14 parts by weight of 1-amino-3-imino-4,7-dithia-4,5,6,7-tetrahydro-isoindolenine, 7 parts by weight of 1-amino-3-imino-5-phenyl-isoindolenine, 5,4 parts by weight of copper acetate, 60 parts by volume of formamide and 60 parts by volume of ethylene glycol are heated to 120° C. for 1 hour while stirring. The further treatment is the same as described in Example 11. Thus, 20 parts by weight of a violet-black pigment are obtained which dissolves in sulfuric acid with a green color and which gives the following analysis: 49.75% C, 2.97% H, 24.3% S.

This pigment contains the following compounds:

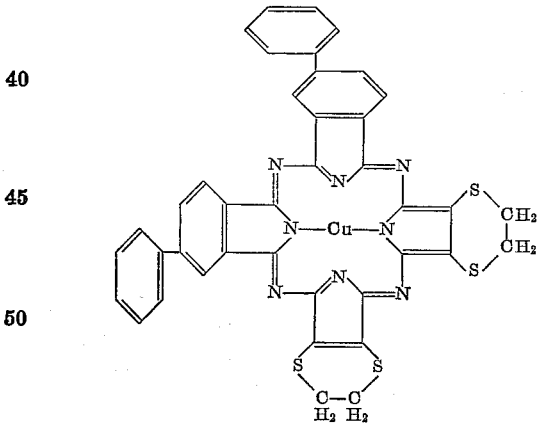

resp.

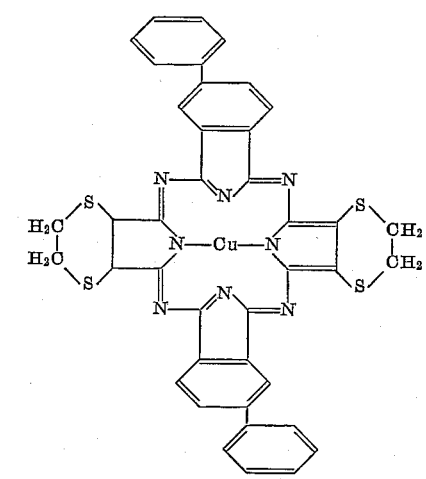

and

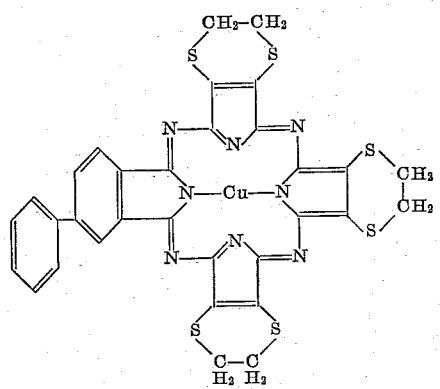

Corresponding nickel-containing dyestuffs are obtained if instead of the copper acetate a corresponding amount of nickel acetate is used.

*Example 13*

100 parts by weight of 1-amino-3-imino-4,7-dithia-4,5,6,7-tetrahydro-isoindolenine and 100 parts by volume of dichlorobenzene are heated for 10 minutes with 100 parts by volume of N,N-dimethyl aniline to 180° C. Thereby a red solution is obtained from which crystalises an octadeca-hydro-octathia-phthalocyanine of the following formula:

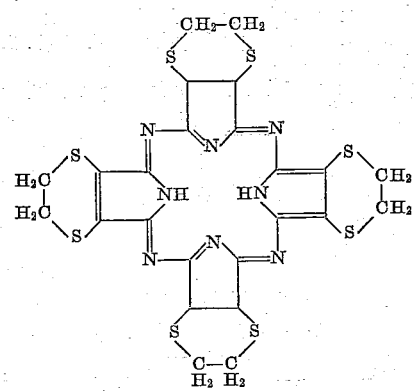

The solution can be diluted with ethanol and the precipitate filtered off, washed with ethanol and dried at 100° C. Yield 91 parts by weight. The dyestuff can be recrystallized from concentrated sulfuric acid. It is reddish-violet and the solution in sulfuric acid is yellow-green.

Instead of N,N-dimethyl aniline there can be also used N-ethyl aniline or benzyl cyanide and instead of the dichlorobenzene there can be also used trichloro benzene or chloro naphthalene.

*Example 14*

17 parts by weight of 1,2,4-tricyano-3,6-dithia-cyclohexene-(1) are stirred into 100 parts by weight of a 36% hydrogen bromide solution in glacial acetic acid at a temperature of 20–25° C.

Thereafter the mixture is diluted with 20 parts by volume of glacial acetic acid. While the starting material dissolves, a salt is precipitated which contains 56.75% of bromine resp. 57.5% of hydrogen bromide. The precipitate is filtered off and washed with ether and dried. Yield: 50 parts by weight of a colorless hydrogen bromide reaction product.

43 parts by weight of this compound are introduced into 200 parts by volume of anhydrous benzene and then added dropwise to 130 parts by volume of a 3,3-methanolic ammonia solution at 5–20° C. Thereby 20 parts by weight of ammonium bromide precipitate which are filtered off. From the filtrate 20 parts by weight of a light brown powder are obtained upon distillation of the solvent in vacuo at 20–30° C.

16 parts by weight of this light brown powder are heated to 140° C. with 2 parts by weight of copper acetate in 100 parts by volume of formamide and 100 parts by volume of ethylene glycol for 10 minutes.

The dyestuff obtained is filtered off, washed with methanol, boiled with aqueous diluted hydrochloric acid, filtered off again, washed neutral and dried at 90–100° C. Thus, 8 parts by weight of a reddish-violet dyestuff are obtained which dissolve in concentrated sulfuric acid with dark blue color. The dyestuff is a hexadecahydro-octathia-copper phthalocyanine tetracarbonic acid amide, the formula of which corresponds to the formula indicated in Example 1, whereby each of the ring systems 1–4 is substituted in one of the 4- or 5-positions by a $CONH_2$-group.

*Example 15*

A mixture consisting of 1000 parts by volume of ethylene glycol, 72 parts by weight of 1-amino-3-imino-isoindolenine, 278 parts by weight of 1-amino-3-imino-4,7-dithia-4,5,6,7-tetrahydro-isoindolenine, and 100 parts by weight of copper acetate are heated to 110–120° C. for 90 minutes while stirring. The pigment formed is filtered off, washed with water and is boiled with diluted aqueous hydrochloric acid and diluted sodium hydroxide solution, washed neutral and dried. Thus, 322 parts by weight of a violet-blue pigment are obtained containing 9.3% copper, 16.06% N and 27.8% S. The dyestuff corresponds to the formula:

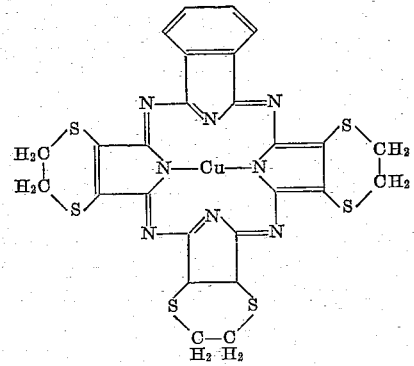

*Example 16*

A mixture consisting of 1000 parts by volume of ethylene glycol, 145 parts by weight of 1-amino-3-imino-isoindolenine, 185 parts by weight of 1-amino-3-imino-4,7-dithia-4,5,6,7-tetrahydro-isoindolenine and 100 parts by weight of copper acetate are treated as described in Example 15. Thus, 267 parts by weight of a violet blue pigment are obtained which contains 9.9% copper, 16.92% N and 18.6% S. This pigment contains tetrathia-octahydro-copper phthalocyanine, the formula of which corresponds to the nickel compound mentioned in Example 4.

*Example 17*

A mixture consisting of 1000 parts by volume of ethylene glycol, 218 parts by weight of 1-amino-3-imino-isoindolenine, 93 parts by weight of 1-amino-3-imino-4,7-dithia-4,5,6,7-tetrahydro-isoindolenine and 100 parts by weight of copper acetate are treated as described in Example 15. Thus, 275 parts by weight of a navy-blue pigment are obtained which contains 10.8% copper, 18.15% N and 11.1% S. The dyestuff is a dithia-tetrahydro-copper phthalocyanine having the following formula:

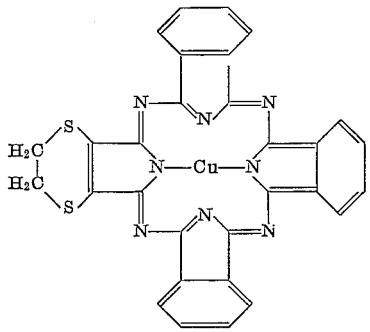

A corresponding nickel-containing dyestuff is obtained if instead of the copper acetate a corresponding amount of nickel acetate is used.

*Example 18*

A mixture consisting of 1000 parts by volume of ethylene glycol, 232 parts by weight of 1-amino-3-imino-isoindolenine, 74 parts by weight of 1-amino-3-imino-4,7-dithia-4,5,6,7-tetrahydro-isoindolenine and 100 parts by weight of copper acetate are treated as described in Example 15. Thus, 265 parts by weight of a navy-blue pigment are obtained which contains 10.8% copper, 18.45% N and 8.9% S.

*Example 19*

To a mixture consisting of 84.4 parts by weight of 1-amino-3-imino-isoindolenine, 27.7 parts by weight of 1-amino-3-imino - 4,7-dithia - 4,5,6,7 - tetrahydro-isoindolenine in 375 parts by volume of methanol a solution of 30 parts by weight of copper acetate dissolved in 150 parts by volume of a 10% ammonia solution is added. This mixture is stirred at 45° C. for about 16–20 hours. Then the solid parts are filtered off, washed with methanol and dried. Thus, 102 parts by weight of a brownish-yellow powder are obtained which dissolve in diglycol monomethyl ether or in pyridine with yellow-brown color. If the brownish-yellow powder is dissolved in diglycol monomethyl ether and an aqueous solution of sodium dithionit added, a reddish-blue copper-containing pigment is precipitated at room temperature. The same dyestuff is obtained if the brownish-yellow powder is heated with dimethyl aniline for 15 minutes to the boil.

The solution of the brownish-yellow powder in diglycol monomethyl ether, thio diglycol or similar solvents can be used for obtaining deep-violet-blue prints on native or regenerated cellulose by the method described in Example 9.

*Example 20*

18.6 parts by weight of the disodium salt of the 1,2-dicyano-1,2-dimercapto ethylene, 9.9 parts by weight of 1,2-dichloroethane and 100 parts by volume of absolute alcohol are heated in a closed vessel for 6 hours to 100° C. The precipitate obtained is filtered off and extracted with chloroform. The alcohol extract is introduced into the fourfold amount of water and this mixture then extracted several times with chloroform. The chloroform extracts are washed with water, treated with active carbon and dried with sodium sulfate. Upon evaporating the solvent 13 parts by weight of 1,2-dicyano-3,6-dithia-cyclohexene-(1) is obtained which is purified as described in Example 2.

50 parts by weight of 1,2-dicyano-3,6-dithiacyclohexene-(1) are stirred with 100 parts by weight of anhydrous methanol and, while passing over $NH_3$, 20 parts by weight of a 15 percent methanolic sodium methylate solution are added dropwise at 20–25° C. The exothermic heat is compensated by cooling. A colourless intermediate product crystallises out which dissolves again with progressive reaction. This colourless intermediate product is 1-amino-3,3-dimethoxy-4,7-dithia-4,5,6,7-tetrahydro-isoindolenine.

The resultant crystal slurry is filtered off by suction at 0° C. after 20–24 hours and washed with a mixture of equal parts of methanol and acetone. 45 parts by weight of pure 1,3-diimino-4,7-dithia-4,5,6,7-tetrahydro-isoindoline are thus obtained. Further portions of the base may be precipitated as a red nitrate as indicated in Example 2.

A compound similar to the 1-amino-3,3-dimethoxy-4,7-dithia-4,5,6,7-tetrahydro-isoindolenine can be obtained as follows:

10 parts by weight of sodium methylate are dissolved in 400 parts by volume of ethylene glycol and then slowly introduced 200 parts by weight of 1,2-dicyano-3,6-dithia-cyclohexene-(1) at 25–35° C. Thereafter acetone is added, the precipitate filtered off and washed with acetone. Thus 328 parts by weight of 1-amino-3,3-bis(β'-hydroxy ethoxy) 4,7-dithia-4,5,6,7-tetrahydro-isoindolenine are obtained. This compound can be used in the same manner as the corresponding dimethoxy compound. If this compound is boiled in acetic acid anhydride an acetyl derivative is obtained having the formula $C_{12}H_{14}N_2O_4S_2$. Melting point 209–210° C.

*Example 21*

297 parts by weight of the disodium salt of 1,2-dicyano-1,2-dimercapto ethylene are dissolved in a mixture of 300 parts of water and 300 parts by weight of methanol. Thereafter 120 parts by volume of ethylenebromide are added at 10° C. The mixture is stirred for 5 hours at 25° C. Thereafter the precipitate is filtered off, washed with a 50 percent methanol and dried. Thus 130 parts by weight of 1,2-dicyano-3,6-dithia-cyclohexene-(1) are obtained.

40 parts by weight of 1,2-dicyano-3,6-dithiacyclohexene-(1) are stirred at 20–30° with 325 parts by weight of 20 percent hydrogen bromide in glacial acetic acid. Whilst the starting material dissolves, the exothermic heat is compensated by cooling. After a few hours the yellow hydrogen bromide adduct crystallises out. The precipitation is completed by cooling to 0–5° C. It can readily be isolated by suction-filtration, and washing with ether or benzine. The resultant 94 parts by weight of the intermediate product are introduced into a mixture of 150 parts by volume of benzene and 150 parts by volume of 7,8-n-methanolic ammonia, the temperature being maintained at 20–25° C. by cooling. The reaction is completed by heating the mixture to 30–35° C. for a brief period, the ice-cold precipitated ammonium bromide (55 parts by weight) is then filtered off by suction and the reddish brown filtrate brought to dryness under a vacuum at 30–35° C. 54 parts by weight of a brownish red powder are thus obtained having the approximate formula $(C_6H_7N_3S_2)_2+HBr$.

*Example 22*

18.6 grams of the disodium salt of 1,2-dicyano-1,2-dimercaptoethylene are suspended in 100 millilitres of absolute alcohol and 20 grams of 1,2-dibromopropane in 50 millilitres of alcohol are added dropwise with cooling and passing through nitrogen. After boiling under reflux for 3 hours, the solution is cooled and poured into four times its volume of water. 11 grams of 4-methyl-1,2-dicyano-3,6-dithia-cyclohexene-(1) are filtered off by suction. Upon crystallisation form 70 percent alcohol and decolouring with charcoal colourless crystals are obtained of M.P. 87–88° C.

5 parts by weight of 1,2-dicyano-4-methyl-3,6-dithia-cyclohexene-(1) are suspended in 14 parts by weight of methanol, the mixture is saturated by passing over $NH_3$ and 3 parts by weight of a 15 percent methanolic sodium methylate solution are simultaneously introduced dropwise. The temperature is kept at 20–25° C. by cooling.

A brownish yellow solution is formed from which the reaction product crystallises out after some time. After 5 hours the product is filtered off by suction at 0–5° C. and the filter residue washed with an ice-cold mixture of equal parts of methanol and acetone.

4.5 parts by weight of the yellow 1,3-dimino-5-methyl-4,7-dithia-4,5,6,7-tetrahydro-isoindoline are thus obtained.

*Example 23*

26.4 grams of 1,2-dibromo-1-phenylethane are added to a suspension of 21 grams of the disodium salt of 1,2-dicyano-1,2-dimercaptoethylene in 150 millilitres of absolute alcohol. The mixture is first stirred at 40° C. for 30 minutes while passing through nitrogen and then heated under reflux for 90 minutes. After cooling, the precipitate formed is filtered off by suction and extracted with chloroform. By evaporation of the chloroform and concentration of the alcoholic reaction solutions, a total of 10.2 grams of 4-phenyl-1,2-dicyano-3,6-dithia-cyclohexene-(1) are obtained. M.P. 129–130° C.

5 grams of 1,2-dicyano-4-phenyl-3,6-dithiacyclohexene-(1) are stirred at 20–25° C. with 18 grams of a 37 percent solution of hydrogen bromide in glacial acetic acid. The starting material dissolves. After some time the hydrogen bromide adduct precipitates being obtained after some stirring in the form of a crystal slurry. After 20–70 hours the crystallisation is completed by the addition of ether, the cold reaction product is filtered off by suction, washed with ether and dried over potassium hydroxide in vacuo.

The product thus obtained is introduced with cooling into a mixture of 40 millilitres of anhydrous benzene and 40 millilitres of 3-n-methanolic ammonia, the mixture is warmed to 35° C. for a few minutes, filtered off by suction at 15–20° C. and washed with a mixture of benzene and methanol (1:1). The filter residue consists substantially of approximately 5 grams of NH$_4$Br. The filtrates contain about 6 grams of the brown basic hydrobromide of 1-amino-3-imino-5-phenyl-4,7-dithia-4,5,6,7-tetrahydro-isoindolenine which is isolated by distilling off the solvent in vacuo at 20–30° C.

*Example 24*

150 parts by weight of

NaS—CS—CN+3(CH$_3$)$_2$NCHO (obtained by the process described by Bähr and Schleitzer in "Chemische Berichte," vol. 88, page 1771) are dissolved in 200 parts of water. After 20 hours, the precipitated sulfur is filtered off. To the filtrate there are added 22 parts by volume of ethylenebromide and 100 parts by volume of methanol. This mixture is stirred for 7 hours at 20–25° C. Thereafter the precipitate is filtered off, washed with a 50 percent methanol and dried. Thus 31 parts by weight of 1,2-dicyano-3,6-dithiacyclohexene-(1) are obtained.

Instead of the methanol, there can be used also another solvent which is miscible with water, such as dimethylformamide or dioxane. If the process is carried out in the absence of oxygen, a very pure nearly white product is obtained. If the process is carried out in the presence of oxygen similar pure products can be obtained, if the process is carried out in the presence of an antioxydant such as potassium boranate.

*Example 25*

To a solution of 20 parts by weight of the disodium salt of 1,2-dicyano-1,2-dimercapto ethylene in 130 parts by volume of absolute ethanol there are added dropwise 23 parts by weight of 2,3-dibromo-1-methoxypropan dissolved in 40 parts by volume of ethanol at 30° C., while stirring and passing through nitrogen. Thereafter the mixture is stirred for 30 minutes at 40° C. and then heated under reflux for 90 minutes. Upon cooling the sodium bromide formed is filtered off, the solution is concentrated and then poured into water. The oil obtained is taken up in ether. The ether solution is then washed with water and dried with sodium sulfate. Upon evaporating the solvent 10 parts by weight of 4-methoxy-methyl - 1,2 - dicyano - 3,6 - dithia - cyclohexene - (1) are obtained as an oil from which yellow crystals are obtained upon cooling.

*Example 26*

8 parts by weight of 1,2-dicyano-3,6-dithiacyclohexene-(1) and 4 parts by weight of sodamide are dissolved in 40 parts by weight of formamide. After 20 hours the dark yellow reaction mixture is stirred in a solution of 8 parts by weight of ammonium nitrate and 24 parts by weight of acetic acid in 400 parts by weight of water, the precipitated red nitrate is filtered off by suction and washed with water and acetone. 6.5 parts by weight of C$_6$H$_7$N$_3$S$_2$+HNO$_3$ are thus obtained corresponding to 55 percent of the theoretical yield.

*Example 27*

Into a solution consisting of 186 parts by weight of the disodium salt of 1,2-dicyano-1,2-dimercapto ethylene, 10 parts by weight of the sodium salt of dibutylnaphthaline sulfonic acid and 1 part by weight of potassium-borhydride dissolved in 1500 parts of water and 750 parts by volume of dimethylformamide, there are added dropwise within 15 minutes 150 parts by weight of 2,3-dichloropropionitrile at 25–50° C. Upon about further 30 minutes the reaction product begins to crystallize. Upon cooling off the precipitate is filtered off, washed with water and dried. Thus 135 parts by weight of the nearly colourless 1,2,4-tricyano-3,6-dithia-cyclohexene-(1) are obtained. The product can be recrystallized from chlorobenzene. The pure, colourless product dissolves with yellow colour in concentrated sulfuric acid or diluted aqueous ammonia.

*Example 28*

10 parts by weight of 1-amino-3-imino-4,7-dithia-4,5,6,7-tetrahydro-isoindolenine and 2 parts by weight of copper acetate are heated to 65° C. for 40 minutes, in 90 parts by weight of methanol. 10 parts by weight of a brown dyestuff intermediate product are thus obtained which may readily be isolated by suction-filtration at room temperature. It contains 7% Cu, 29.4% S and 16.23% N.

The dyestuff intermediate product is soluble in thiodiglycol, diglycol monomethyl ether and similar solvents and can be converted into the octathia-hexadecahydro copper phthalocyanine by heating to temperatures of above 100° C.

We claim:

1. A tautomeric compound having the following formula

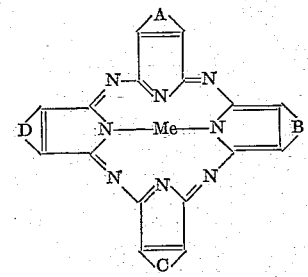

wherein A, B and C are each selected from the group consisting of lower alkyl,

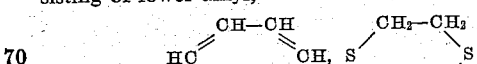

lower alkyl-substituted

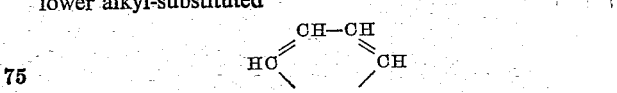

phenyl-substituted

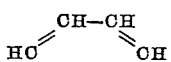

lower alkyl-substituted

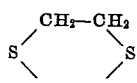

and phenyl-substituted

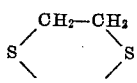

and wherein D stands for a member selected from the group consisting of

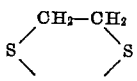

lower alkyl-substituted

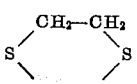

and phenyl-substituted

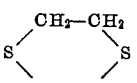

and wherein Me is a heavy metal atom selected from the group consisting of nickel, cobalt and copper.

2. A compound which in one of its tautomeric forms is of the formula

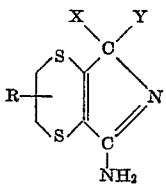

whereby X and Y stand for a member selected from the group consisting of methoxy, ethoxy and β-hydroxyethoxy groups and whereby R represents a member selected from the group consisting of hydrogen, lower alkyl and phenyl.

3. A compound which in one of its tautomeric forms is of the following formula

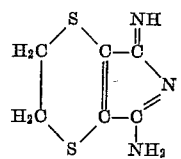

4. A compound which in one of its tautomeric forms is of the following formula

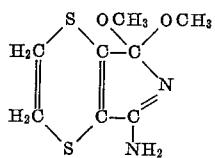

5. A compound which in one of its tautomeric forms is of the formula

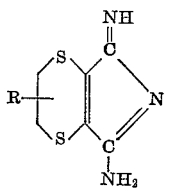

whereby R represents a member selected from the group consisting of hydrogen, lower alkyl and phenyl.

References Cited in the file of this patent
UNITED STATES PATENTS

| | | |
|---|---|---|
| 2,683,643 | Baumann et al. | July 13, 1954 |
| 2,739,151 | Rosch et al. | Mar. 20, 1956 |
| 2,739,155 | Rosch et al. | Mar. 20, 1956 |
| 2,752,346 | Rosch et al. | June 26, 1956 |

OTHER REFERENCES

Lubs: Chemistry of Synthetic Dyes and Pigments, pages 580—581 (1956).

G. Bahr et al.: Chemische Berichte, vol. 90, pages 438–443 (1957).

G. Bahr et al.: Chemical Abstracts, 1957, vol. 51, col. 9587e.